United States Patent [19]
Pfeiffer

[11] Patent Number: 5,899,641
[45] Date of Patent: May 4, 1999

[54] BULK MATERIAL CONVEYING SYSTEM AND EJECTOR THEREFOR

[75] Inventor: John W. Pfeiffer, Hughesville, Pa.

[73] Assignee: The Young Industries, Muncy, Pa.

[21] Appl. No.: 08/949,968

[22] Filed: Oct. 14, 1997

Related U.S. Application Data

[63] Continuation of application No. 08/609,396, Mar. 1, 1996, abandoned.

[51] Int. Cl.[6] .................................................... B65G 53/14
[52] U.S. Cl. ............................................ 406/144; 406/153
[58] Field of Search .................................... 137/888, 889; 239/427.5, 428, 434; 406/122, 124, 125, 126, 144, 146, 153, 194

[56] References Cited

U.S. PATENT DOCUMENTS 4,764,058  8/1988  Jones et al. .......................... 406/153 X
5,018,910  5/1991  Weiss ....................................... 406/144

*Primary Examiner*—Andrew C. Pike
*Attorney, Agent, or Firm*—Lalos & Keegan

[57] ABSTRACT

An ejector for providing motive gas for conveying particulate solids from a solids supply vessel through a conveying pipeline includes a gas introduction stage and a solids introduction stage. The gas introduction stage includes a fluids mixing chamber having a principal inlet port for connecting to a source of high-pressure compressed gas, an outlet port connected to the solids introduction stage, and a secondary inlet port that is open to the atmosphere or other low-pressure gas source. The solids introduction stage includes a fluids/solids mixing chamber having an inlet port connected to the gas introduction stage, an outlet port for connecting to a pipeline, and a material receiving port for connecting to a vessel outlet. As the compressed gas enters the gas introduction stage, the high velocity gas induces atmospheric air or other low-pressure gas from the secondary inlet port, thus increasing the mass flow into the solids introduction stage.

9 Claims, 1 Drawing Sheet

5,899,641

BULK MATERIAL CONVEYING SYSTEM AND EJECTOR THEREFOR

This is a continuation of U.S. patent application Ser. No. 08/609,396 filed on Mar. 1, 1996, which application has been abandoned.

BACKGROUND OF THE INVENTION

The present invention relates to a pneumatic system for conveying particulate materials and more particularly to pneumatic conveying ejectors for introducing a flow of pressurized motive gas that provides energy for conveying the particulate solids.

Typically, particulate material that is stored in a hopper or silo or is exiting a manufacturing process is gravity fed into a solids supply vessel or rotary valve airlock and then conveyed through a pipeline to a remote collection site. The pipeline, which is connected to the material outlet at the bottom of the solids supply vessel or rotary valve airlock, is pressurized to within a desired pressure range that provides a pressure differential between the solids supply vessel or rotary valve airlock and the remote collection site suitable to achieve a desired material flow in the pipeline. An ejector may, under certain conditions, replace the solids supply vessel or rotary valve to supply compressed gas (e.g., air) into the pipeline to move the particulate material through the pipeline as it is delivered from the granular solids source.

In certain environments, particulate material is conveyed using a supply of compressed gas having a gauge pressure of 15 psig or less. This low pressure gas is supplied by a suitable low-pressure compressor. Alternately, rather than using a dedicated low-pressure compressor, the plant's high-pressure (e.g., 80–120 psig) compressed gas source may be used to power the conveying ejector. The high-pressure supply is regulated to a lower pressure before delivery to the ejector.

SUMMARY OF THE INVENTION

The present invention improves the efficiency of ejectors for low-pressure pneumatic conveying systems that are powered by gas (e.g., air) from a high-pressure source. In the system of the present invention, the ejector for conveying particulate solids includes two stages, a gas introduction stage and a solids introduction stage. The solids introduction stage connects to the outlet of the source of granular solids to be conveyed and to the pipeline for introducing compressed gas and solids into the pipeline to convey the material flowing from the outlet through the pipeline. The gas introduction stage mixes the high pressure gas from the high-pressure source with air or other suitable gas at atmospheric or low pressure and discharges such mixture into the solids introduction stage.

The gas introduction ejector stage includes a T-shaped or cylindrically shaped fluids mixing chamber with a primary inlet port, an outlet port that is collinear with the primary inlet port, and a transversely located, upper secondary inlet port. The primary inlet port has connected therein a high-pressure compressed gas supply connector, which is in turn connected to a high-pressure source. The outlet port has connected therein a nozzle that provides communication between the gas introduction ejector stage fluids mixing chamber and a similar T-shaped or cylindrically shaped fluids/solids mixing chamber of the solids introduction ejector stage. The secondary inlet port of the gas introduction ejector stage is opened to the atmosphere or other source of suitable low-pressure gas.

In operation, as high-pressure compressed gas enters the gas introduction stage mixing chamber at high velocity, a vacuum is created in the gas introduction stage mixing chamber which draws in atmospheric air or other low-pressure gas from the secondary inlet port. This mixture of compressed gas and atmospheric air/low-pressure gas is discharged at a high velocity into the solids introduction stage fluids/solids mixing chamber through the connecting nozzle. The particulate solids passing from the outlet of the solids supply vessel enter the fluids/solids mixing chamber and are entrained in the high velocity mixture of compressed gas and atmospheric air/low-pressure gas, and the gas/air/suspended solids mixture is conveyed out of the fluids/solids mixing chamber and through the pipeline.

In this manner, the normally wasted energy of the high-pressure compressed gas is used to induce additional mass flow. Inducing additional mass flow by drawing atmospheric air or low-pressure gas in through the secondary inlet port allows a reduction in the amount of high-pressure gas needed to meet the mass flow requirements of the system, thereby saving energy and costs associated therewith.

DETAILED DESCRIPTION

Figure 1:
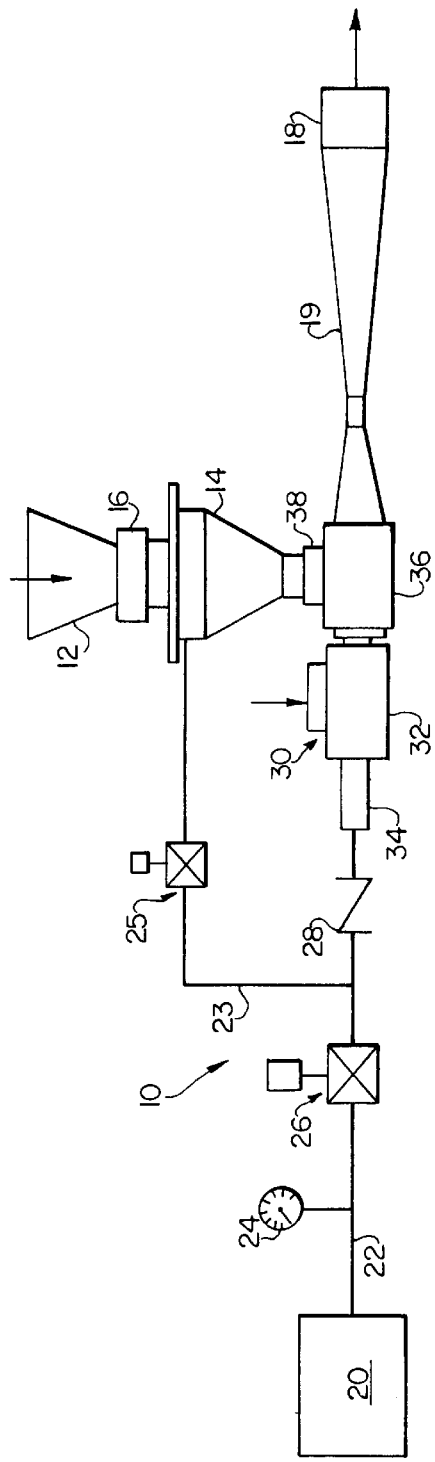
FIG. 1 is a schematic view of the pneumatic conveying system of the present invention.

The pneumatic conveying system 10 of the present invention is shown generally in FIG. 1. The system includes a product source 12, e.g., a hopper or silo containing particulate material, a solids supply vessel or spout 14 in communication with hopper 12 for receiving material therefrom through gravity flow and under control of inlet valve 16 (required only in some environments), a pneumatic pipeline 18 with diffuser 19 for conveying material from vessel 14, and a source 20 of high-pressure compressed gas (e.g., air). Typically, source 20 will be the plant's high-pressure compressed gas source having a gauge pressure in the range of about 80–120 psig.

Conveying gas passes through high-pressure gas conducting channel 22 that has connected therein pressure gauge 24, a valve 26, and check valve 28 (optional in some environments). An optional secondary channel 23 is divided off from main channel 22 to supply compressed gas to solids supply vessel 14 through throttling valve 25. The ejector 30 of the present invention includes a gas introduction stage 32 that connects to channel 22 through high-pressure connector 34, and a solids introduction stage 36 that connects to gas introduction stage 32, material outlet 38 of solids supply vessel 14, and conveying pipeline 18.

Figure 2:
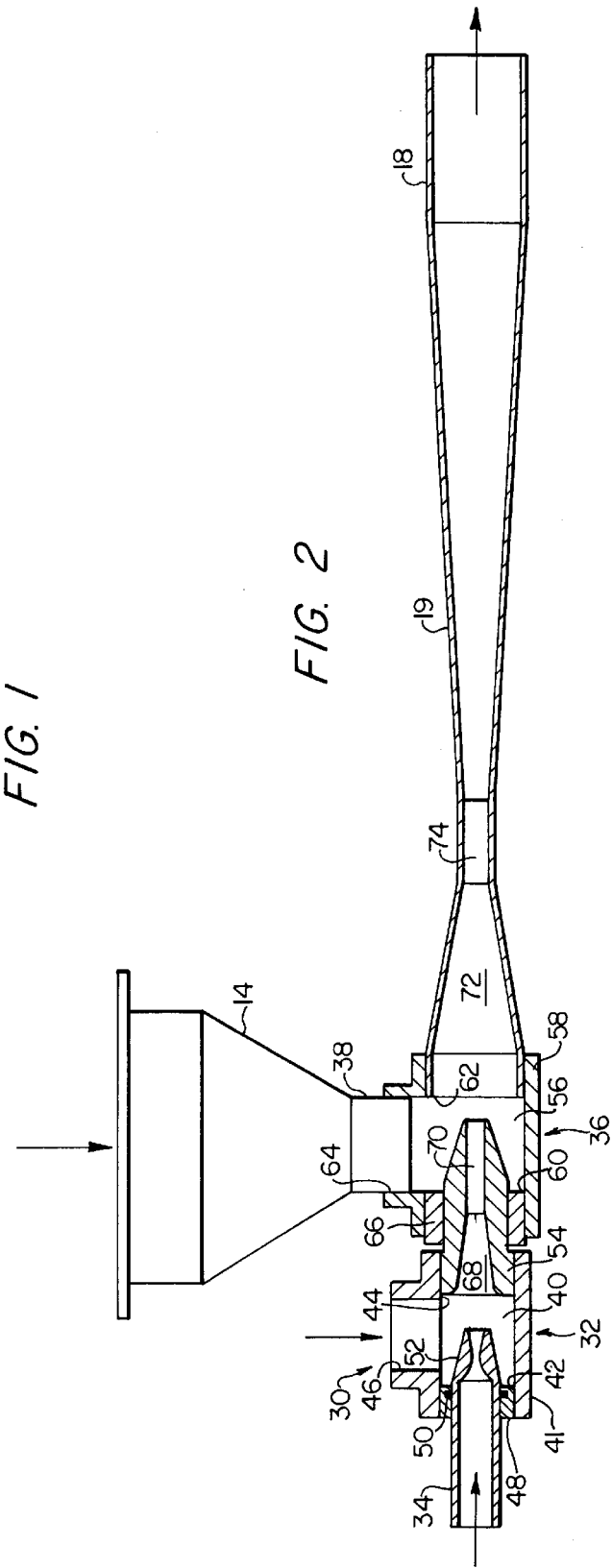
FIG. 2 is a side, partial cross-sectional view of the two-stage ejector of the present invention.

As best shown in FIG. 2, gas introduction stage 32 of ejector 30 includes a generally T-shaped fluids mixing chamber 40 formed by a generally cylindrical wall 41 and has a primary inlet port 42, an outlet port 44 collinear with primary inlet port 42, and a transversely located, upper secondary inlet port 46, which is open to the atmosphere or other low-pressure gas supply. Chamber 40 will generally be slightly below atmospheric pressure. High-pressure connector 34 is supported within primary inlet port 42 in a mounting block 48 with a sealing O-ring 50.

Connector 34 connects on one end to high-pressure gas conducting channel 22, which in turn is connected to high-pressure gas source 20, as shown in FIG. 1. Connector 34 terminates on the ejector end in an orifice 52 that is located within chamber 40 and is aligned coaxially with the opening of nozzle 54. Nozzle 54 is mounted within outlet port 44 of chamber 40 in any suitable manner.

Solids introduction stage 36 of ejector 30 includes a generally T-shaped fluids/solids mixing chamber 56 formed by generally cylindrical wall 58 and has an inlet port 60, an outlet port 62 collinear with inlet port 60, and a transversely located material receiving port 64. Nozzle 54 is supported within inlet port 60 in a mounting block 66. The opening through nozzle 54 includes a convergent cone section 68 located proximately to orifice 52, and a throat 70 that opens into chamber 56.

Diffuser 19 of pipeline 18 is mounted within outlet port 62 of chamber 56 in any suitable manner. Diffuser 19 is preferably formed as a venturi with a convergent cone section 72 located proximately to throat 70 of nozzle 54, a constricted throat section 74, and a divergent cone section. Material outlet 38 of solids supply vessel 14 is mounted within upper port 64 of chamber 56 in any suitable manner.

In operation, high-pressure compressed gas is delivered from source 20 through channel 22 to connector 34. As the compressed gas passes through orifice 52 of connector 34 and into the lower pressure fluids mixing chamber 40 (which is generally below atmospheric pressure), the high velocity gas draws in atmospheric air or low-pressure gas from the upper secondary inlet port 46 as it enters the convergent cone section 68 of the opening in nozzle 54, thereby increasing the mass flow through nozzle 54. This mixture of compressed gas and atmospheric air/low-pressure gas is discharged from throat 70 of nozzle 54 into fluids/solids mixing chamber 56 of solids introduction stage 36. Particulate solids passing from material outlet 38 enter chamber 56 through upper material receiving port 64 and are entrained in the high velocity mixture of compressed gas and atmospheric air/low-pressure gas, and the gas/air/suspended solids mixture is moved by positive pressure through diffuser 19 and into the downstream conveying pipeline 18.

The induction of atmospheric air or low-pressure gas in gas introduction stage 32 of ejector 30 prior to entrainment of the particulate solids in solids introduction stage 36 yields an increase in mass flow over that provided by the high pressure gas alone. Thus, sufficient mass flow for solids conveyance can be achieved without increasing the size of orifice 52 (which would increase the amount of compressed gas flowing into chamber 40). Flow rate requirements for pneumatic conveying systems are calculated using conventional and well-known methods. Once the flow rate requirements for a given system are established, the relationship between the size of orifice 52 for admitting compressed gas and the size of upper port 46 for admitting atmospheric air or low-pressure gas can be determined empirically to achieve the necessary flow. It has been found, for example, that with the present invention at least one cubic foot of atmospheric air can be induced for every cubic foot of compressed air supplied to ejector 30, yielding at least a 50% saving of compressed air while still providing the desired mass flow.

From the foregoing detailed description, it will be evident that there are a number of changes, adaptations, and modifications of the present invention which come within the province of those having ordinary skill in the art to which the aforementioned invention pertains. However, it is intended that all such variations not departing from the spirit of the invention be considered as within the scope thereof as limited solely by the appended claims.

I claim:

1. An apparatus for conveying particulate solids, said apparatus comprising:
   a vessel for holding said particulate solids;
   a conduit for transporting said particulate solids; and
   an ejector having first and second chambers, a first inlet communicating with said first chamber and communicable with a source of a first gas under a first pressure, a second inlet communicating with said first chamber and communicable with a source of a second gas under a second pressure less than said first pressure, a passageway disposed in longitudinal alignment with said first inlet and intercommunicating said first and second chambers, a third inlet intercommunicating said second chamber and said vessel, and an outlet intercommunicating said second chamber and said conduit whereby upon communication of said first inlet with said source of first gas and said second inlet with said source of second gas, said first gas injected into said first chamber will educe said second gas into said first chamber to produce a gas mixture, said gas mixture will be injected through said passageway into said second chamber and educe said solids from said vessel into said second chamber to produce a gas/solids mixture, and said gas/solids mixture will be injected into and through said conduit.

2. An ejector for educing particulate solids from a vessel and injecting said solids into and through a conduit comprising a body having first and second chambers, a first inlet communicating with said first chamber and communicable with a source of a first gas under a first pressure, a second inlet communicating with said first chamber and communicable with a source of a second gas under a second pressure less than said first pressure, a passageway disposed in longitudinal alignment with said first inlet and intercommunicating said first and second chambers, a third inlet communicating with said second chamber and communicable with said vessel, and an outlet communicating with said second chamber and communicable with said conduit whereby upon communication of said first inlet with said source of first gas, said second inlet with said source of second gas, said third inlet with said vessel, and said outlet with said conduit, said first gas injected into said first chamber will educe said second gas into said first chamber to produce a gas mixture, said gas mixture injected through said passageway into said second chamber will educe said solids from said vessel into said second chamber to produce a gas/solids mixture, and said gas/solids mixture will be injected into and through said conduit.

3. An apparatus for conveying particulate solids, said apparatus comprising:
   a vessel for holding said particulate solids;
   a conduit for transporting said particulate solids; and
   an ejector having first and second chambers, a first inlet including a first venturi communicating with said first chamber and communicable with a source of a first gas under a first pressure, a second inlet communicating with said first chamber and communicable with a source of a second gas under a second pressure less than said first pressure, a passageway intercommunicating said first and second chambers including a second venturi, a third inlet intercommunicating said second chamber and said vessel, and an outlet intercommunicating said second chamber and said conduit whereby upon communication of said first inlet with said source of first gas and said second inlet with said source of second gas, said first gas injected into said first chamber will educe said second gas into said first chamber to produce a gas mixture, said gas mixture will be injected through said passageway into said second chamber and educe said solids from said vessel into said second chamber to produce a gas/solids mixture, and said gas/solids mixture will be injected into and through said conduit;

wherein said first inlet and said passageway intercommunicating said chambers of said ejector are disposed in longitudinal alignment.

4. An apparatus according to claim 3, wherein said first pressure is in a range of 80 to 120 psig.

5. An apparatus according to claim 4, wherein said second pressure is at atmospheric pressure.

6. An ejector for educing particulate solids from a vessel and injecting said solids into and through a conduit comprising a body having first and second chambers, a first inlet including a first venturi communicating with said first chamber and communicable with a source of a first gas under a first pressure, a second inlet communicating with said first chamber and communicable with a source of a second gas under a second pressure less than said first pressure, a convergent passageway intercommunicating said first and second chambers including a second venturi, a third inlet communicating with said second chamber and communicable with said vessel, and an outlet communicating with said second chamber and communicable with said conduit whereby upon communication of said first inlet with said source of first gas, said second inlet with said source of second gas, said third inlet with said vessel, and said outlet with said conduit, said first gas injected into said first chamber will educe said second gas into said first chamber to produce a gas mixture, said gas mixture injected through said passageway into said second chamber will educe said solids from said vessel into said second chamber to produce a gas/solids mixture, and said gas/solids mixture will be injected into and through said conduit;

wherein said first inlet and said passageway intercommunicating said chambers of said ejector are disposed in longitudinal alignment.

7. An apparatus according to claim 6, wherein said second inlet of said ejector is disposed transversely relative to the longitudinal alignment of said first inlet and said passageway.

8. An apparatus according to claim 6, wherein said passageway of said ejector is disposed in longitudinal alignment with said conduit.

9. An apparatus according to claim 8, wherein said third inlet of said ejector is disposed transversely relative to the longitudinal alignment of said passageway and said conduit.

* * * * *